United States Patent
Breitenbach et al.

(10) Patent No.: US 10,259,065 B2
(45) Date of Patent: Apr. 16, 2019

(54) DUAL-TORCH WELDING SYSTEM

(75) Inventors: Steven Louis Breitenbach, Scotia, NY (US); William Edward Babcock, Broadalbin, NY (US); Jonathan Tropp Salkin, Harrisburg, PA (US); Alan Silvia, Clifton Park, NY (US); Andrew Batton Witney, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 680 days.

(21) Appl. No.: 13/179,749

(22) Filed: Jul. 11, 2011

(65) Prior Publication Data

US 2013/0015171 A1    Jan. 17, 2013

(51) Int. Cl.
| | | |
|---|---|---|
| *B23K 9/32* | (2006.01) | |
| *B23K 9/028* | (2006.01) | |
| *B23K 9/00* | (2006.01) | |
| *B23K 9/173* | (2006.01) | |
| *B23K 9/067* | (2006.01) | |

(52) U.S. Cl.
CPC .......... *B23K 9/0286* (2013.01); *B23K 9/0017* (2013.01); *B23K 9/067* (2013.01); *B23K 9/1735* (2013.01)

(58) Field of Classification Search
CPC .. B23K 9/0017; B23K 9/0286; B23K 9/1735; B23K 9/067; H05B 37/02
USPC ............ 219/59.1, 60 A, 60.2, 125.11, 130.5, 219/130.51, 136
See application file for complete search history.

(56) References Cited

U.S. PATENT DOCUMENTS

| | | | | |
|---|---|---|---|---|
| 3,838,244 | A * | 9/1974 | Petrides et al. | ............ 219/130.5 |
| 4,145,593 | A | 3/1979 | Merrick et al. | |
| 4,283,617 | A * | 8/1981 | Merrick et al. | ............ 219/125.1 |
| 4,373,125 | A | 2/1983 | Kazlauskas | |
| 4,567,348 | A * | 1/1986 | Smith | .................. B23Q 35/127 |
| | | | | 219/124.34 |
| 5,171,954 | A * | 12/1992 | Rinaldi | ........................... 219/61 |
| 5,189,279 | A | 2/1993 | Foster, III et al. | |
| 5,914,055 | A | 6/1999 | Roberts et al. | |
| 6,281,464 | B1 * | 8/2001 | Topper | ............................ 219/75 |
| 6,603,096 | B2 * | 8/2003 | Lee et al. | ................. 219/124.34 |
| 6,657,161 | B2 * | 12/2003 | Marhofer | ............. B23K 9/0216 |
| | | | | 219/125.11 |
| 6,947,802 | B2 * | 9/2005 | Picard et al. | .................. 700/117 |
| 7,735,709 | B2 * | 6/2010 | Koppert et al. | ............. 228/47.1 |
| 2004/0217096 | A1 * | 11/2004 | Lipnevicius | ............. 219/125.11 |
| 2005/0050837 | A1 * | 3/2005 | Wang | ............................ 52/721.3 |
| 2005/0205530 | A1 * | 9/2005 | Picard et al. | .............. 219/121.6 |

(Continued)

OTHER PUBLICATIONS

Unofficial English translation of Office Action issued in connection with corresponding CN Application No. 201210238639.4 dated Feb. 28, 2015.

*Primary Examiner* — Dana Ross
*Assistant Examiner* — James F Sims, III
(74) *Attorney, Agent, or Firm* — Ernest G. Cusick; Hoffman Warnick LLC (57) ABSTRACT

A dual-torch welding system is disclosed. In one embodiment, the welding system includes a pair of torches positioned in an other than opposing arrangement to weld a substantially circular component therebetween, and a means for rotating the substantially circular component and the pair of torches relative to one another, allowing welding of the substantially circular component by the pair of torches.

20 Claims, 9 Drawing Sheets

(56) References Cited

U.S. PATENT DOCUMENTS

| | | | |
|---|---|---|---|
| 2005/0252898 A1* | 11/2005 | Blechinger et al. | 219/130.5 |
| 2008/0083713 A1* | 4/2008 | Sanders | 219/121.57 |
| 2009/0230109 A1* | 9/2009 | Amador et al. | 219/137 R |
| 2010/0224597 A1 | 9/2010 | Keller et al. | |
| 2010/0263507 A1* | 10/2010 | Rozot et al. | 83/39 |
| 2010/0301103 A1* | 12/2010 | Bonelli | B23K 9/0216 228/227 |
| 2012/0103947 A1* | 5/2012 | Flaig et al. | 219/121.44 |
| 2013/0008881 A1* | 1/2013 | Berbakov | B23K 9/0216 219/136 |

\* cited by examiner

DUAL-TORCH WELDING SYSTEM

BACKGROUND OF THE INVENTION

The subject matter disclosed herein relates to a welding system. Specifically, the subject matter disclosed herein relates to a welding system configured to weld a sealed component (e.g., a pressure vessel, turbine rotor forgings, etc.) having purge holes along a weld seam.

Conventional welding systems used for welding a sealed component include a dual-torch system, where the torches are located opposite one another on a common axis. The sealed component includes purge holes displaced along the weld seam of the sealed component. As the sealed component rotates and the torches begin to weld the component, the unwelded purge holes aid in minimizing pressure difference between the sealed cavity and the exterior. Just prior to the final purge hole being welded by the torches, heat from the torches causes the temperature to rise within the cavity of the sealed component, and thereby increase the pressure within the cavity. This increase in pressure within the cavity can cause unacceptable weld morphology, or even weld rupture of the root (i.e., weld root blow out, weld root fall in, etc.) as the final purge hole is welded and the cavity is sealed.

In order to avoid unacceptable weld morphology or weld rupture of the sealed component, a bore or permanent pressure release hole is sometimes incorporated into the sealed component. However, the use of a permanent pressure release hole creates new problems for the sealed component, including a high stress state surrounding the permanent pressure release hole while the component is being utilized within a system (i.e., steam-turbine energy system, etc.). A permanent release hole of the sealed component can also serve as a stress concentrator and increase the risk of cracking or mechanical failure, which may require expensive repair and/or complete replacement of the sealed component. Furthermore, the permanent pressure release hole may require continuous inspections, which may be costly and inconvenient to a user.

Use of a single torch welding system may significantly reduce the heat added to the component during welding, and thus reduce the pressure within the cavity while welding the final purge hole. This approach may reduce the likelihood of unacceptable weld concavity, or weld blow-through. However, the single torch welding system increases the amount of time required to complete a proper weld of the sealed component. Additionally, a single torch creates an uneven distribution of heat along the weld seam. This uneven distribution of heat of the weld seam may create angular distortion in the weld, prevent the sealed component from being cylindrically uniform, and, as a result, may cause the sealed component to be unsuitable for use in systems that require strict cylindrical uniformity (i.e., steam-turbine energy system, etc.)

BRIEF DESCRIPTION OF THE INVENTION

A first aspect of the invention provides a welding system comprising: a pair of torches positioned in an other than opposing arrangement to weld a substantially circular component therebetween; and means for rotating the substantially circular component and the pair of torches relative to one another, allowing welding of the substantially circular component by the pair of torches.

A second aspect of the invention provides a welding system comprising: a pair of torches positioned in an other than opposing arrangement to weld a substantially circular component therebetween; and means for rotating the substantially circular component and the pair of torches relative to one another, allowing welding of the substantially circular component by the pair of torches; a control system coupled to the pair of torches, the control system configured to control an ignition of each of the pair of torches during welding of the substantially circular component.

A third aspect of the invention provides a welding station comprising: a support for rotatably positioning a substantially circular component to be welded; and a welding system for welding the substantially circular component, the welding system including, a pair of torches positioned in an other than directly opposite arrangement about the substantially circular component.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

In one embodiment of the invention, a welding system is disclosed including: a pair of torches positioned in an other than opposing arrangement to weld a substantially circular component therebetween; and means for rotating the substantially circular component and the pair of torches relative to one another, allowing welding of the substantially circular component by the pair of torches.

Figure 1:
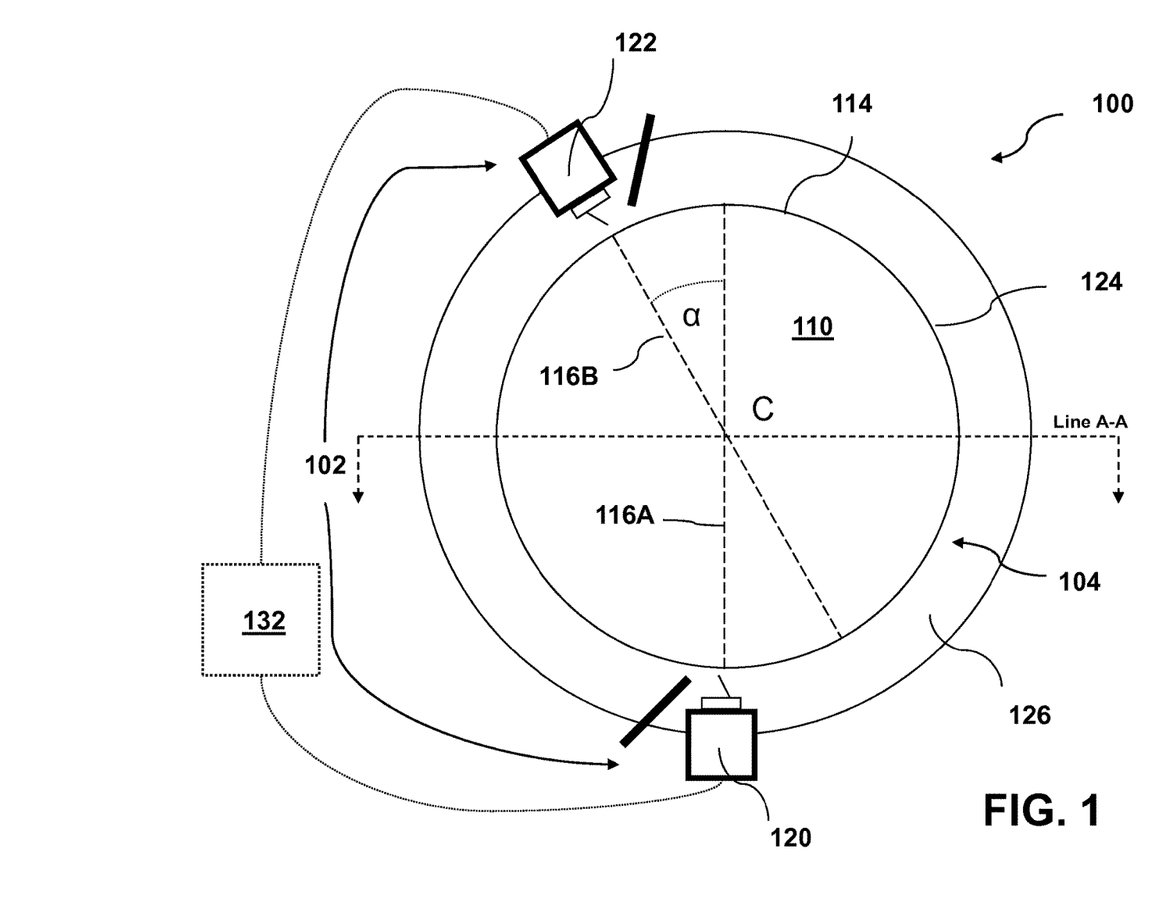
FIG. 1 shows a horizontal top perspective view of a welding system according to embodiments of the invention.

Turning to the drawings, FIG. 1 shows a horizontal top perspective view of a welding system 100 according to embodiments of the invention. Welding system 100 includes a pair of torches 102 configured to weld a substantially circular (e.g., cylindrical) sealed component 104 positioned therebetween. In an example embodiment, as best shown in FIG. 1, pair of torches 102 may be configured as ARC welding torches. However, it is understood that the teachings of the invention are not limited to this specific type of welding torches.

Figure 2:
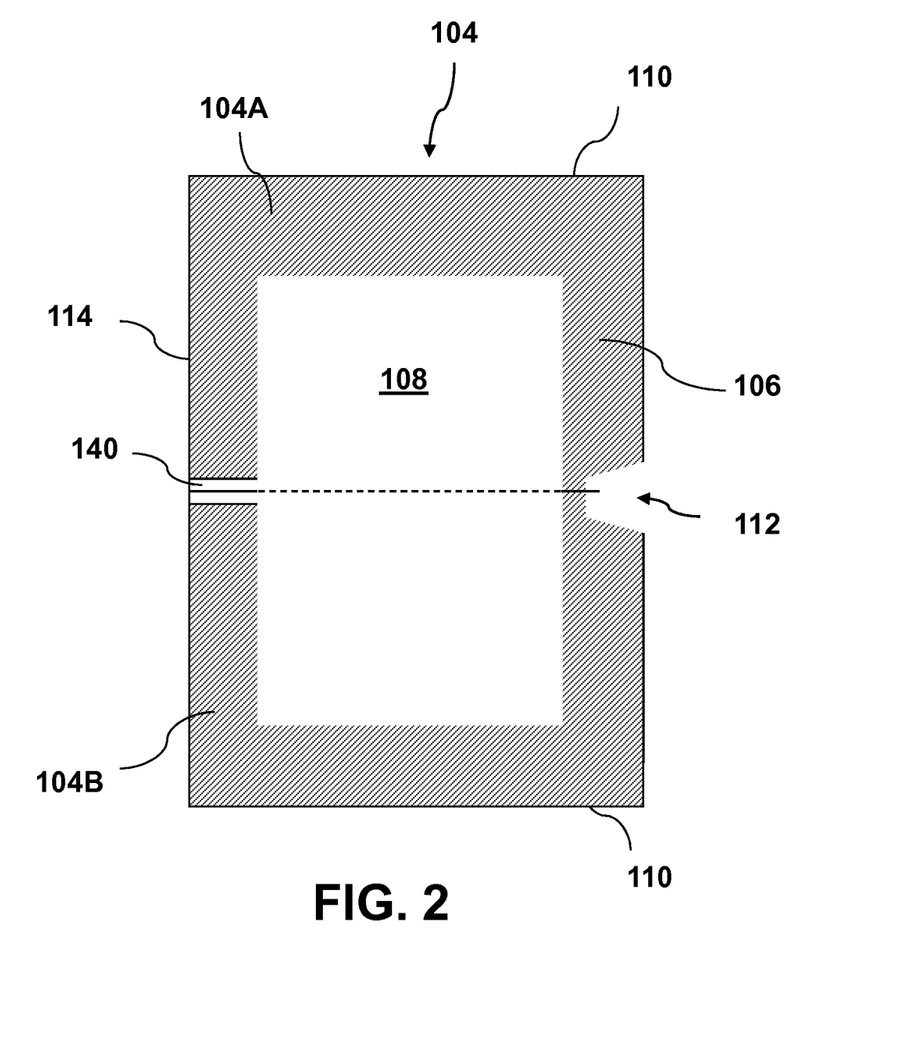
FIG. 2 shows a cross-sectional view of FIG. 1, via line A-A, of a welding system according to the embodiments of the invention.

As shown in FIG. 1 and FIG. 2, the latter a cross-sectional view of FIG. 1 along line A-A, substantially circular sealed component 104 is configured as a substantially sealed tube. More specifically, substantially circular sealed component 104 may be formed from a top portion 104A substantially coupled to a separate and/or distinct bottom portion 104B, such that substantially circular sealed component 104 defines a fluidly continuous space (e.g., cavity 108). Substantially circular sealed component 104 includes a substantially circular wall 106, surrounding a cavity 108 of sealed component 104, and two ends 110. Sealed component 104 may also include a weld seam 112, substantially located on an outer surface 114 of sealed component 104. In an example embodiment, as best shown in FIG. 2, weld seam 112 may be configured to extend substantially around outer surface 114 of sealed component 104 and may extend substantially through wall 106 of sealed component 104. Sealed component 104 may be configured as any weldable material, e.g., stainless steel, non-ferrous metals, alloys or any other now known or later developed material or combination of material. More specifically, sealed component 104 may be configured as a single weldable material, such that top component 103A and bottom component 103B are configured as the same weldable material. In an alternative embodiment, sealed component may be configured as different combinations of weldable material, such that top component 103A and bottom component 103B may be configured as distinctly different weldable materials.

In the example embodiment, as best shown in FIG. 1, pair of torches 102 may be positioned in an other than opposing arrangement, as shown by pair of torches 102 distinct axes 116A, 116B, adjacent outer surface 114 for welding sealed component 104. More specifically, as shown in FIG. 1, pair of torches 102 may be positioned on distinct axes 116A, 116B, such that distinct axes 116A, 116B intersect a center C of sealed component 104. As shown in FIG. 1, distinct axes 116A, 116B of pair of torches 102 may be separable by an angle α, other than approximately 0 degrees. More specifically, distinct axes 116A, 116B of pair of torches 102 may be separable by angle α, such that angle α may be substantially between 5 and 85 degrees. Distinct axes 116A, 116B separation (e.g., angle α) may be predetermined based upon the diameter of sealed component 104.

Figure 3:
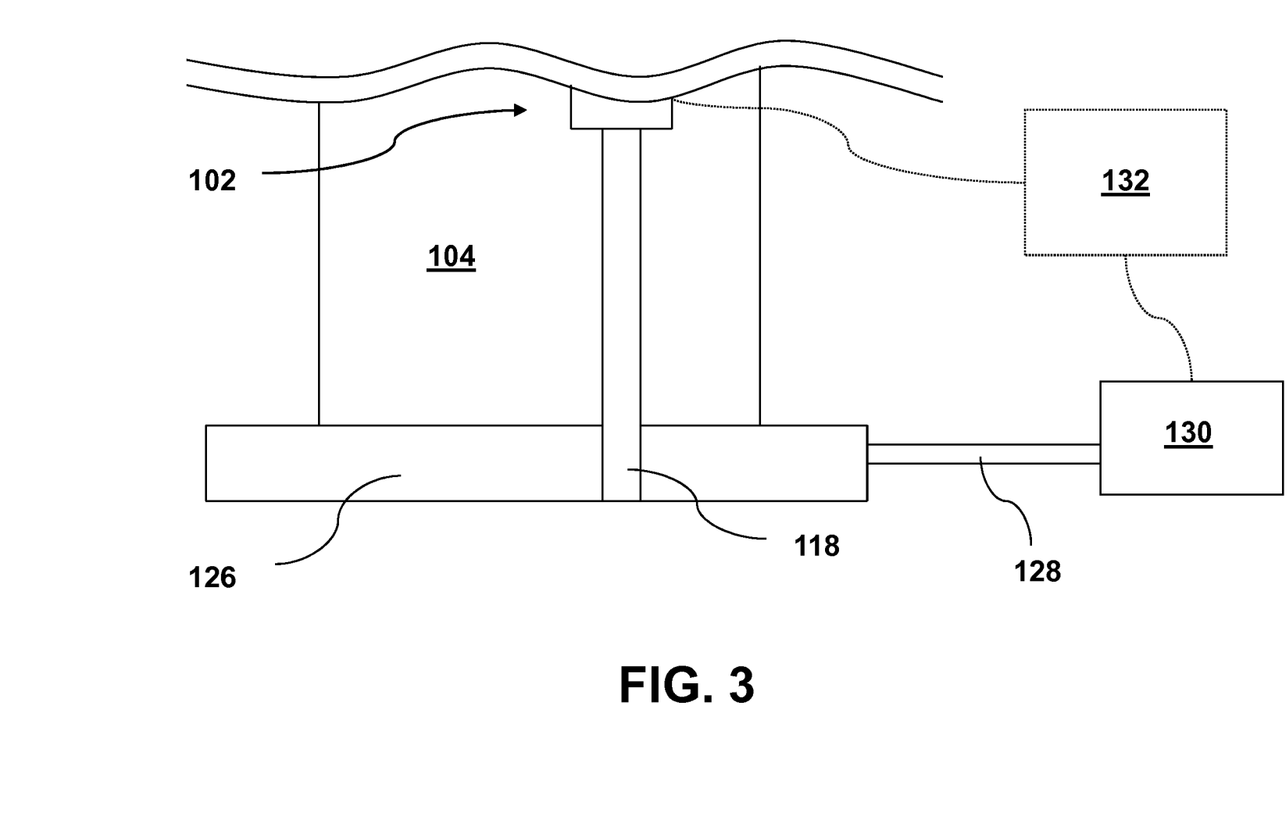
FIG. 3 shows a front view of a welding system according to the embodiments of the invention.

In the example embodiment, as shown in FIG. 3, pair of torches 102 may be substantially coupled to adjustable-stationary stands 118. Adjustable-stationary stands 118 may vary the height of pair of torches 102 and may keep pair of torches 102 substantially stationary while welding sealed component 104. Adjustable-stationary stands 118 may also be adjusted laterally, such that, as shown in FIG. 1, pair of torches 102 may also be positioned substantially adjacent outer surface 114 of sealed component 104. Pair of torches 102 may be positioned substantially adjacent outer surface 114 at a distance dependent on the physical attributes (e.g., material composition, size, depth of weld, etc.) of sealed component 104 and the type of welding torches used as pair of torches 102.

Returning to FIG. 1, pair of torches 102 includes a lead torch 120 and a trail torch 122. In the example embodiment, as best shown in FIG. 1, trail torch 122 may be positioned at an angular distance less than approximately 180 degrees from lead torch 120, relative to a circumference 124 of sealed component 104. More specifically, trail torch 122 may be positioned at a distance between approximately 95 degrees and approximately 175 degrees from lead torch 120, relative to circumference 124 of sealed component 104.

As shown in FIG. 1, pair of torches 102 may be substantially coplanar with one another. More specifically, pair of torches 102 may be positioned by adjustable-stationary stands 118 (FIG. 3) to be substantially coplanar with one another and may be substantially coplanar to weld seam 112 of sealed component 104.

As shown in FIGS. 1 and 3, welding system 100 may also include means for rotating sealed component 104. More specifically, as best shown in FIG. 3, a rotatable support 126 is configured to substantially receive and substantially rotate sealed component 104. In the example embodiment, as shown in FIG. 3, rotatable support 126 and as a result, sealed component 104, may be substantially rotated by a drive shaft 128 of a motor 130. In the example embodiment, drive shaft 128 of motor 130 may be coupled to rotatable support 126 via a bevel gear set (not shown), such that motor 130 rotates drive shaft 128 and provides rotatable support 126 with the means to rotate sealed component 104. However, it is understood that the teachings of the invention are not limited to this specific arrangement of rotatable support 126, drive shaft 128 and motor 130. Drive shaft 128 and motor 130 may also be configured as any other type of rotatable active force system, such as a combustible engine system, hydraulic drive system, motor-gear box transmission, motor-continuously variable transmission (CVT), turbine system, or any other now known or later developed system for rotating rotatable platform 126 and sealed component 104.

In the example embodiment, as shown in FIG. 3, a control system 132 may be coupled to motor 130, such that control system 132 may be configured to control the power to motor 130. In the example embodiment, control system 132 may also be configured to control the speed of motor 130, and thus, may control the speed of rotation for support 126 and sealed component 104, thereon. Control system 132 may be configured as a user-interactive or automated computer system for controlling the motor 130.

Returning to FIG. 1, welding system 100 may also include control system 132 coupled to lead torch 120 and trail torch 122. Control system 132 may include individual torch sensors (not shown) for aiding in the welding of sealed component 104 along weld seam 112. In an example embodiment, as shown in FIG. 1, control system 132 may be coupled to lead torch 120 and/or trail torch 122, and may be configured to control the ignition of lead torch 120 and/or trail torch 122 while welding sealed component 104. In an alternative embodiment, control system 132 may be configured in any known fashion, e.g., positional sensor system, timer system, or other systems to control the ignition of lead torch 120 and trail torch 122, to be discussed in greater detail below.

Figure 4:
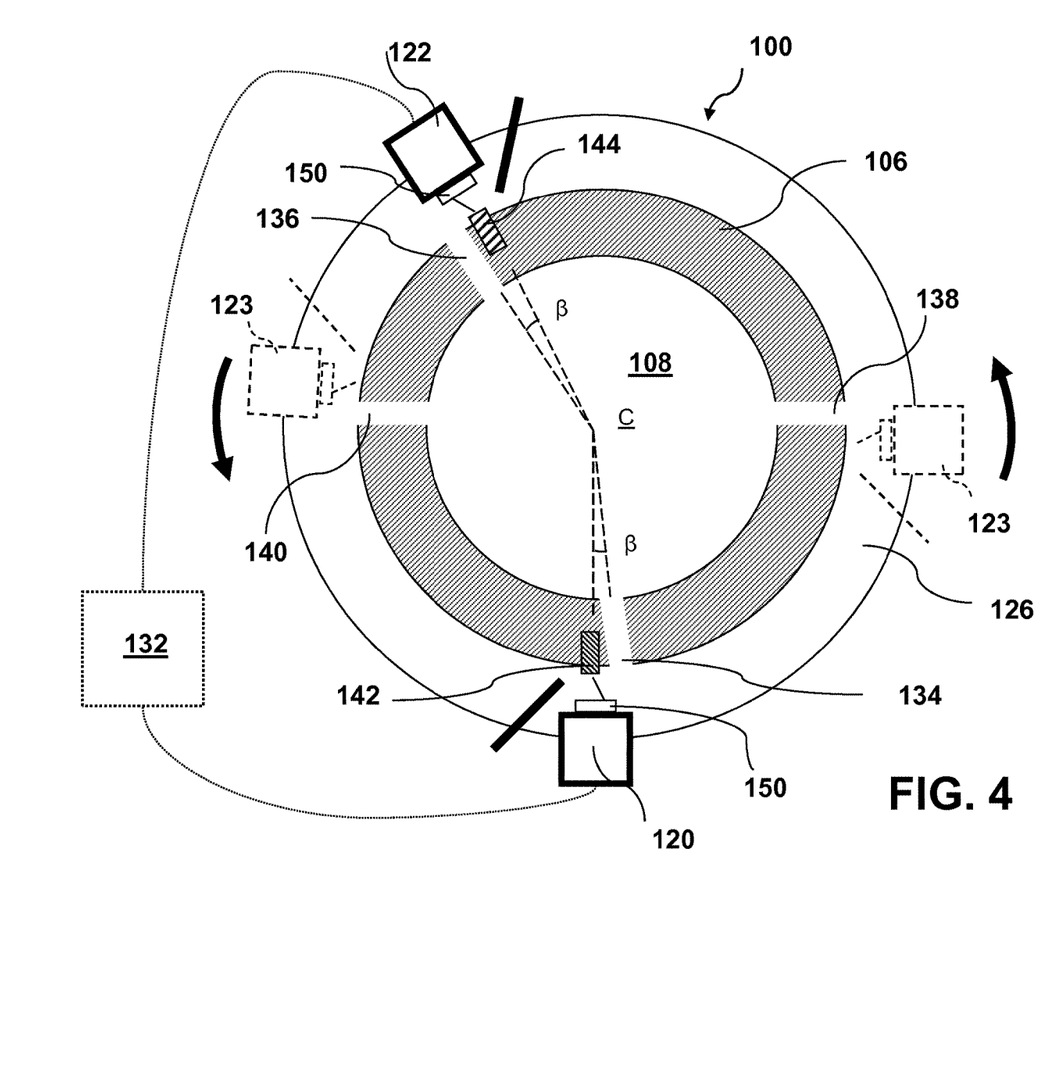
FIGS. 4-6 show a vertical cross-sectional view of the welding system, in various stages of welding, according to embodiments of the invention.
Figure 5:
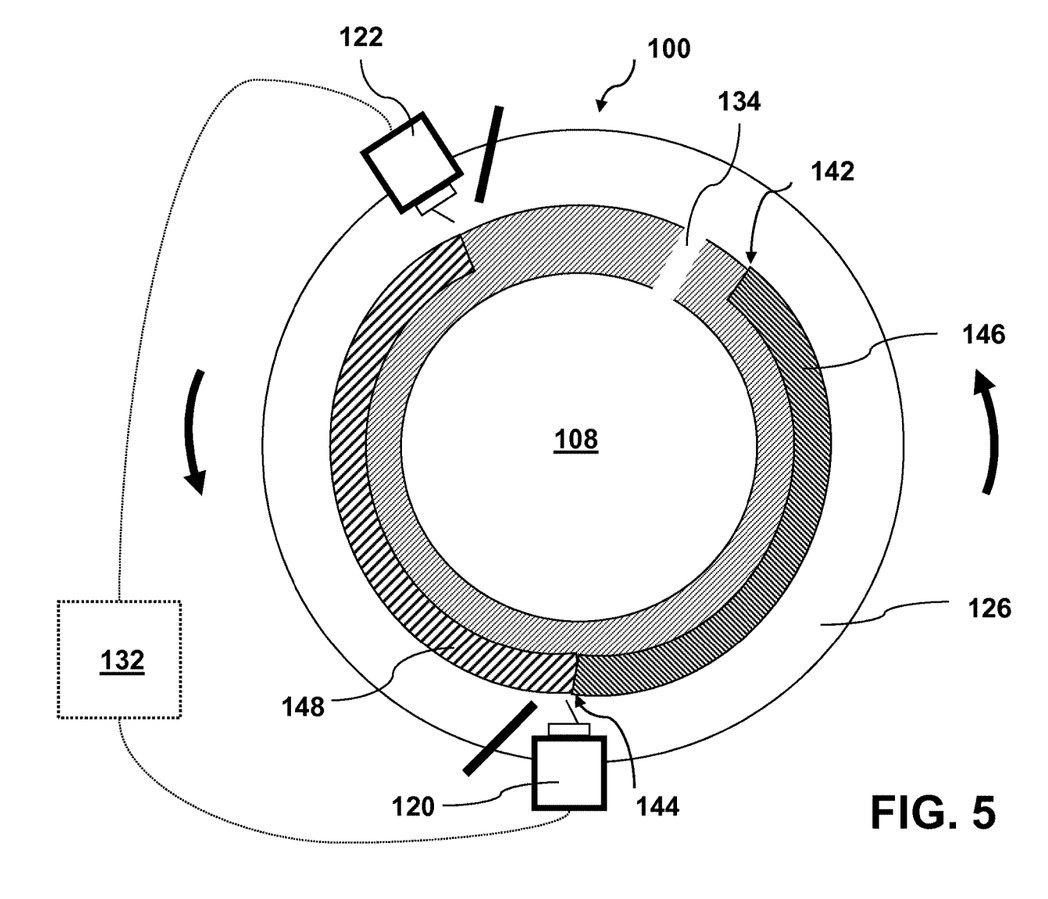
Figure 6:
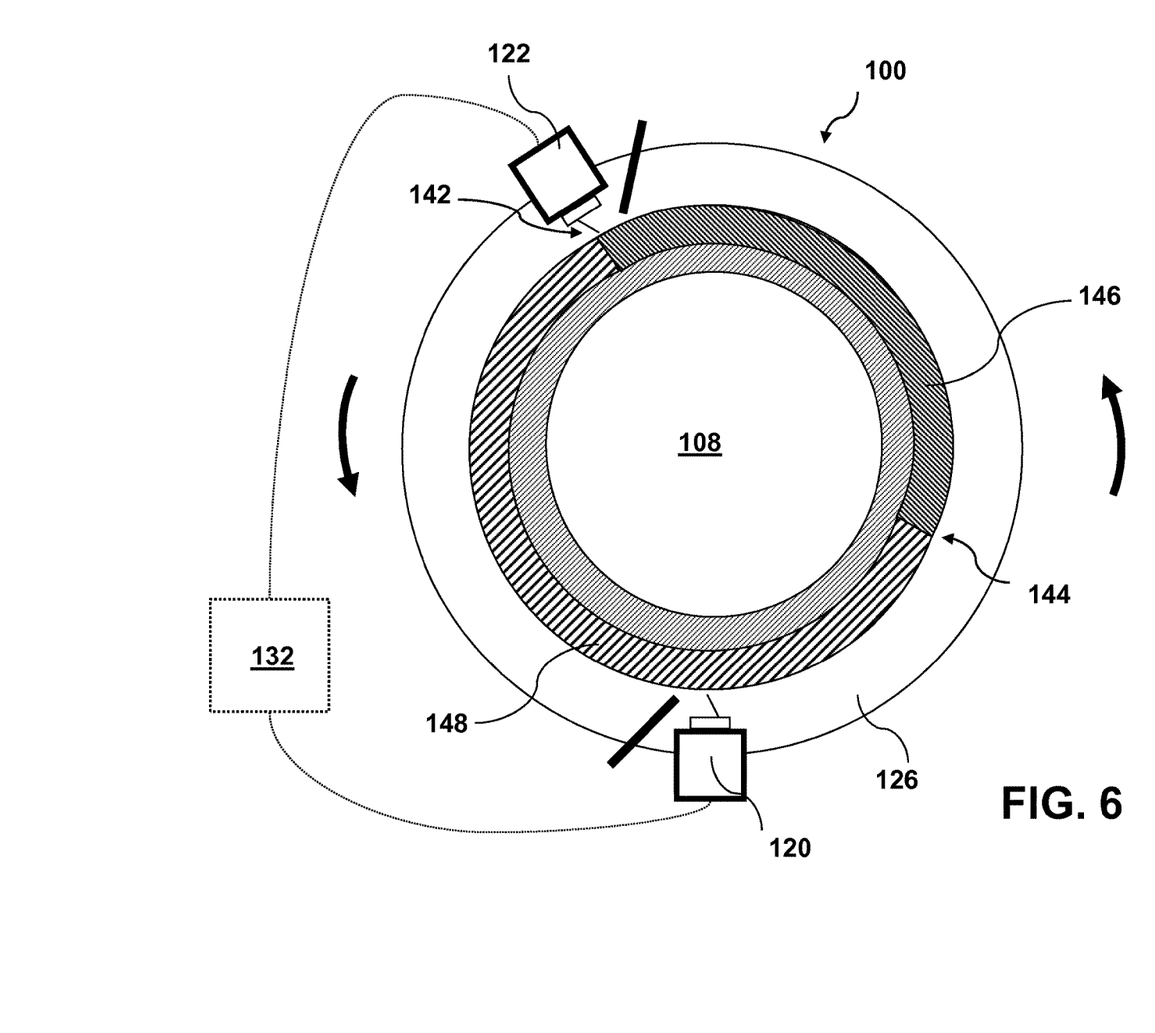

FIGS. 4-6 show a vertical cross-sectional view of the welding system 100 along weld seam 112 according to embodiments of the invention. In an example embodiment, as shown in FIG. 4, sealed component 104 may further include at least one purge hole 134, 136, 138, 140. Purge holes 134, 136, 138, 140 may provide pressure equilibration between cavity 108 of sealed component 104 and outer surface 114 while pair of torches 102 welds sealed component 104. Purge holes 134, 136, 138, 140 may also provide cavity 108 with inert shielding gas used with pair of torches 102 for minimizing oxidation of the weld along weld seam 112 of sealed component 104. In the example embodiment, as best shown in FIG. 4, purge holes 134, 136, 138, 140 may be substantially located around outer surface 114 of sealed component 104, on weld seam 112, and may be disposed substantially through wall 106 of sealed component 104. In the example embodiment, as shown in FIG. 4, a first purge hole 134 may be positioned, relative to a direction of rotation of sealed component 104 as indicated by arrows, substantially offset from lead torch 120. Furthermore, a second purge hole 136 may be positioned, relative to the direction of rotation of sealed component 104 as indicated by arrows, substantially offset from trail torch 122. A third purge hole 138 and a fourth purge hole 140 may also be located substantially opposite one another on sealed component 104 and may be positioned substantially between lead torch 120 and trail torch 122. First purge hole 134 and second purge hole 136 may be substantially offset from lead torch 120 and trail torch 122 by an angle β. Angle β, to which first purge hole 134 and second purge hole 136 may be offset from lead torch 120 and trail torch 122, respectively, may be dependent on the physical attributes (e.g., material composition, size, depth of weld, etc.) of sealed component 104.

In reference to FIGS. 4-6, and the embodiments of welding assembly 100 described herein, a method for welding sealed component 104 using welding assembly 100 will now be discussed. It is understood that aspects of the invention may be described herein with reference to a "root-pass" welding process, which may include the weld pass initially bonding top portion 104A and bottom portion 104B of respective sealed component 104. This root-pass welding process is performed prior to subsequent "fill pass" welding processes, which may include multiple weld passes to fill any remaining space in weld seam 112. However, aspects of the invention may be applied to these subsequent fill pass welding processes as well.

In the example embodiment, as shown in FIG. 4, sealed component 104 may be positioned between lead torch 120 and trail torch 122, as described above, and control system 132 may be configured to allow simultaneous ignition of lead torch 120 and trail torch 122. As shown in FIG. 4, ignition of lead torch 120 by control system 132 may form a lead torch ignition point 142 on outer surface 114 of sealed component 104. Similarly, ignition of trail torch 122 by control system 132 may form a trail torch ignition point 144 on outer surface 114 of sealed component 104. Sealed component 104 may then be rotated by rotatable support 126 in a direction of rotation, as indicated by arrows in FIGS. 4-6, whereby lead torch 120 and trail torch 122 may weld sealed component 104 along weld seam 112. Sealed component 104 may be rotated by rotatable support 126 at a predetermined speed, whereby predetermined speed is based upon at least one of the physical attributes (i.e., material composition, size, depth of weld, etc.) of sealed component 104, the type of welding torches used for pair of torches 102, and a distance D of pair of torches 102 from outer surface 114 of sealed component 104.

It is understood that the configurations described herein are not limited to strictly dual-torch welding systems. For example, in an alternative embodiment, as shown in FIG. 4, welding system 100, described herein, may also include a single additional torch 123, or a plurality of additional torches 123 (e.g. two, three, four, etc.). It is understood that a welding system (e.g., welding system 100), including additional torch(es) 123, may be configured to function in a substantially similar fashion as described with reference to the other Figures herein. In particular, it is understood that a welding system (e.g., welding system 100) employing three or more torches may include at least one pair of torches having an other than opposing arrangement (e.g., lead torch 120 and trail torch 122), such that root-pass welding may be improved as compared with conventional systems.

In an example embodiment, as best shown in FIG. 5, sealed component 104 may be substantially rotated by rotatable support 126 and, as a result, may be substantially welded along weld seam 112. More specifically, sealed component 104 may be welded a first length 146 by lead torch 120. In the example embodiment, as shown in FIG. 5, first length 146 may substantially begin at lead torch ignition point 142 and may substantially end at trail torch ignition point 144. In the example embodiment, lead torch 120 may weld over, or "tie-in," trail torch ignition point 144 and may be extinguished by control system 132 after tying-in trail torch ignition point 144. In the example embodiment, as shown in FIG. 5, control system 132 may be configured to ignite lead torch 120 for a predetermined time, whereby control system 132 allows lead torch 120 to tie-in trail torch ignition point 144 just prior to extinguishing. Predetermined time may be based upon at least one of the physical attributes (i.e., material composition, size, depth of weld, etc.) of sealed component 104, the type of welding torches used for pair of torches 102, a predetermined rotation speed of rotatable support 126, and a distance D of pair of torches 102 from outer surface 114 of sealed component 104. In an alternative embodiment, control system 132 may include an odometer, such that control system 132 extinguishes lead torch 120 after sealed component 104 has been rotated by rotatable support 126 for a predetermined distance and trail torch ignition point 144 has been tied-in by lead torch 120.

In the example embodiment, as shown in FIGS. 5 and 6, trail torch 122 may continue to weld sealed component 104 after control system 132 extinguishes lead torch 120. More specifically, as best shown in FIG. 6, trail torch 122 may weld sealed component 104 for a second length 148, which may include first purge hole 134. In the example embodiment, as shown in FIG. 6, second length 148 may be longer than first length 146. In the example embodiment, as shown in FIG. 6, second length 148 may substantially begin at trail torch ignition point 144 and may substantially end at lead torch ignition point 142. Similarly as described herein and with reference to FIG. 5 and lead torch 120, control system 132 may be configured to ignite trail torch 122 for a predetermined time, whereby control system 132 allows trail torch 122 to tie-in lead torch ignition point 142 just prior to extinguishing trail torch 122. As shown in FIG. 6, control system 132 may shut off trail torch 122 after tying-in lead torch ignition point 142 and sealed component 104 may be substantially welded along weld seam 112. Motor 130 may be shut off or placed into a predetermined ramp-down sequence after trail torch 122 ties-in lead torch ignition point 142, such that sealed component 104 and rotatable support 126 may be substantially stationary. In an alternative embodiment, control system 132 may include a odometer, whereby control system 132 extinguishes trail torch 122 after sealed component 104 has been rotated a predetermined distance and lead torch ignition point 142 has been tied-in.

In the example embodiment, as shown in FIGS. 4-6, lead torch 120 and/or trail torch 122 may also include a camera system 150, for example, coupled substantially at the base of lead torch 120 and/or trail torch 122. In the example embodiment, as shown in FIGS. 4-6, camera system 150 may be integrated with control system 132, such that camera system 150 may provide the user with a visual depiction of the weld of sealed component 104 by lead torch 120 and/or trail torch 122, respectively. More specifically, camera system 150 may allow the user to view the weld of lead torch 120 and/or trail torch 122, to determine if the weld meets a desired standard of weld (i.e., quality control) or to determine the position of lead torch 120 and/or trail torch 122 with respect to sealed component 104. Information from camera system 150 may be used by the operator to manually implement torch extinguishing sequences at the two tie-in points mentioned above. Camera system 150 may be integrated with control system 132, whereby camera system 150 may display the visual of the weld of sealed component 104 on an output device (not shown) included with control system 132. In an alternative embodiment, camera system 150 may be provided with a separate output device for displaying the visual of the weld of sealed component 104 to the user. The visual depiction provided by camera system 150 may include, but may not be limited to, a still image, still images which may be updated based on predetermined increments, a live-motion feed of the weld of sealed component 104, thermal images or live-feed, infrared images or live-feed and any other now known, or later developed means for providing a visual depiction of the weld of sealed component 104.

In the example embodiment, the extinguishing of lead torch 120 prior to the welding of first purge hole 134 and the extinguishing of trail torch 122, allows for the heat input to the weld and, thus the temperature and pressure increase within cavity 108 to remain substantially low. More specifically, welding system 100 may, as described herein and referenced in FIGS. 1-6, significantly maintain a low pressure differential between cavity 108 of sealed component 104 and the exterior while trail torch 122 welds first purge hole 134. An advantage that may be realized in the practice of some embodiments of the described welding system 100 is that, the lowered heat input and the lowered pressure build up in cavity 108 of sealed component 104 during the sealing of first purge hole 134 by trail torch 122 minimizes the negative affects (i.e., blow-through, weld concavity, etc.) of the welds produced by lead torch 120 and trail torch 122.

Figure 7:
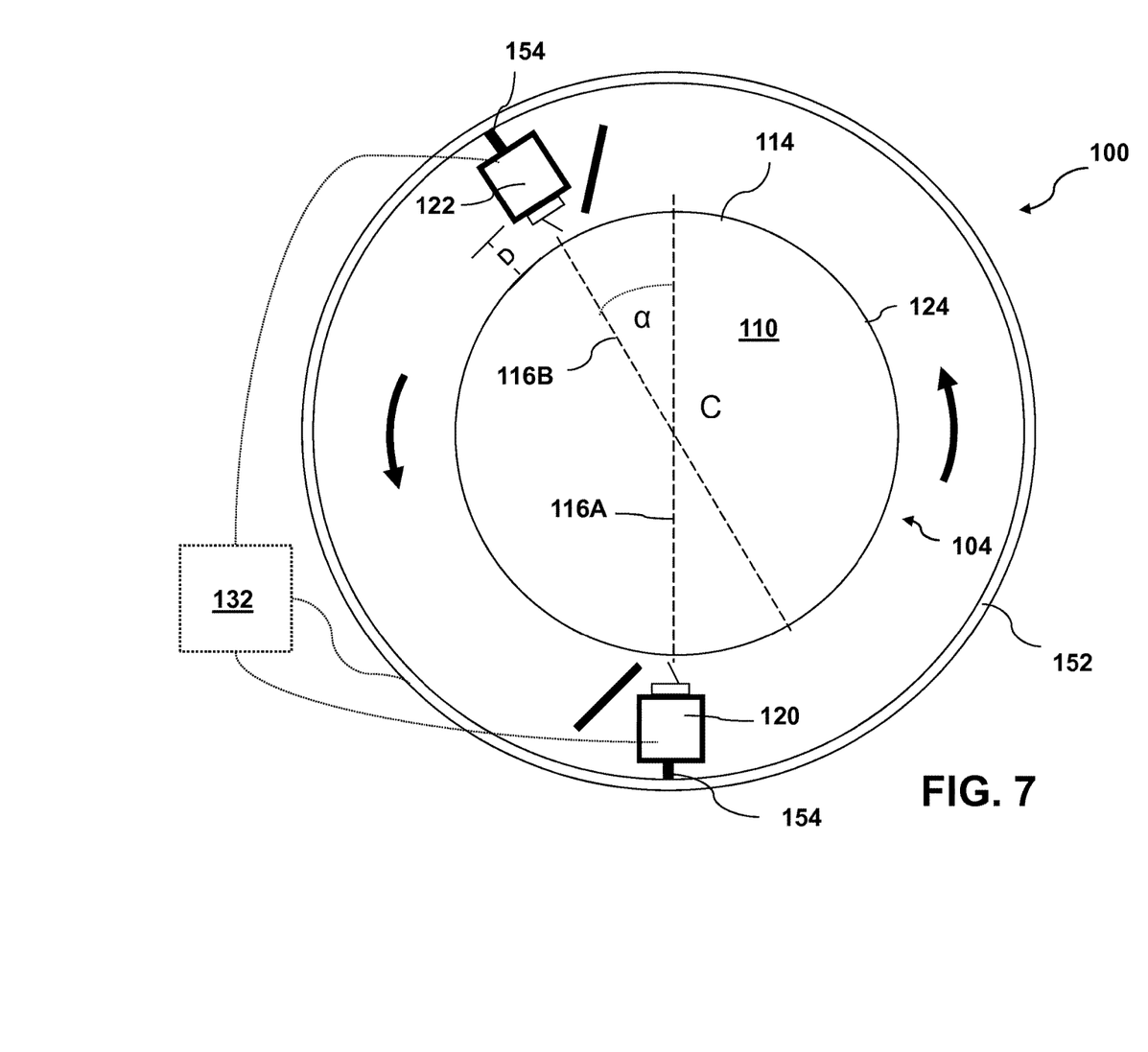
FIG. 7 shows a horizontal top perspective view of an alternative embodiment of a welding system according to embodiments of the invention.

In an alternative embodiment, as shown in FIG. 7, pair of torches 102 may be coupled to a track system 152, such that pair of torches 102 may weld a stationary sealed component 104 by rotating about sealed component 104. In the example embodiment, as shown in FIG. 7, pair of torches 102 may be substantially coupled to track system 152 by track connection rods 154. Track connection rods 154 may be coupled to pair of torches 102 on one end, and may provide an opposite end that extends substantially within track system 152. Track connection rods 154 may also include any means for rotating pair of torches 102 within track system 152, including, but not limited to, a motor and roller system, movable chain system, gear system, and any other now known or later developed system for rotating pair of torches 102 around track system 152. In the example embodiment, as shown in FIG. 7, track system 152 may be substantially stationary and track connection rods 154 may rotate pair of torches 102 within track system 152 while welding sealed component 104. Track connection rods 154 may rotate pair of torches 102 within track system 152 at a predetermined speed. Such predetermined speed is determined in similar fashion, as described in reference to FIGS. 4-6.

As shown in FIG. 7, control system 132 may also be substantially coupled to track system 152 and pair of torches 102, such that control system 132 may be configured to rotate pair of torches 102 within tracking system 152 while welding sealed component 104. More specifically, control system 132 may be configured to ignite the pair of torches 102, as described herein, and control system 132 may be configured to rotate pair of torches 102 by activating, for example, a motor system (not shown) coupled to and configured to drive track connection rods 154 and pair of torches 102 within track system 152.

In an alternative embodiment, track connection rods 154 may be substantially fixed to track system 152. In the alternative embodiment, track system 152 may be configured to rotate while pair of torches 102 welds a stationary sealed component 104. More specifically, pair of torches 102 and track connection rods 154 may be fixed on track system 152 at a position dependent upon at least one of the physical attributes (e.g., material composition, size, depth of weld, etc.) of sealed component 104 and the type of welding torches used for pair of torches 102. Sealed component 104 is welded by pair of torches 102 such that, track system 152 substantially rotates about sealed component 104 at a predetermined speed. Such predetermined speed is determined in similar fashion, as described in reference to FIGS. 4-6.

In an alternative embodiment, control system 132 may be excluded from welding system 100. More specifically, in the alternative embodiment, a user may monitor and manually ignite lead torch 120 and trail torch 122, respectively, while welding sealed component 104. In the alternative embodiment, a user may utilize camera system 150 for providing a visual on the position of sealed component 104 during welding. Camera system 150 may provide the user with the ability to determine if and when to extinguish lead torch 120 and trail torch 122, respectively, by allowing the user to watch lead torch 120 tie-in trail torch ignition point 144 and trail torch 122 tie-in lead torch ignition point 142. In a further embodiment, a user may exclude the use of both control system 132 and camera system 150, such that the user may ignite, extinguish and inspect the weld by personal sight.

Figure 8:
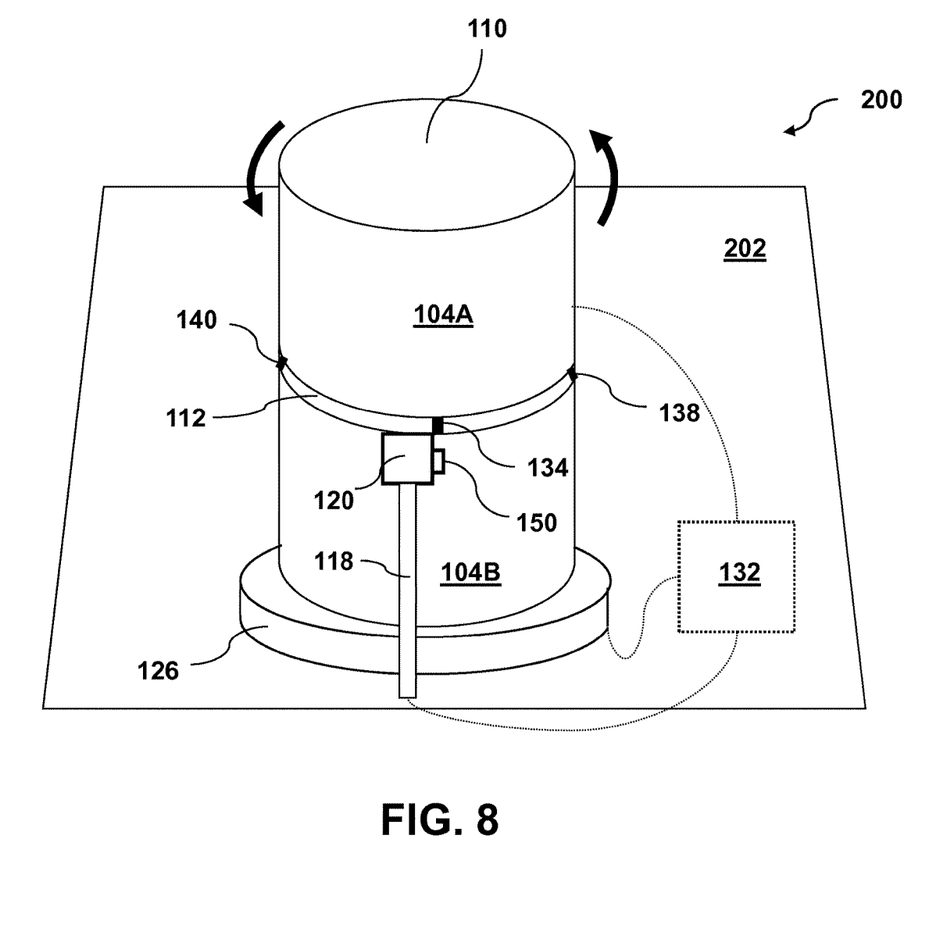
FIG. 8 shows a three-dimensional perspective view of a welding station including welding system, according to embodiments of the invention.

FIG. 8 shows a three-dimensional perspective view of a welding station 200 including welding system 100, according to embodiments of the invention. As shown, many components (e.g., sealed component 104, weld seam 112, outer surface 114, lead torch 120, first purge holes 124, etc.) of welding system 100 may be substantially similar to those shown and described with reference to FIGS. 1-6. It is understood that these similarly numbered components may function in a substantially similar fashion as described with reference to the other figures herein. Redundant explanation of these elements has been omitted for clarity.

In an example embodiment, as best shown in FIG. 8, welding station 200 includes rotatable support 126 for rotatably positioning sealed component 104 to be welded by welding system 100. In the example embodiment, welding system 100 may be disposed on a surface 202 for welding sealed component 104. More specifically, as shown in FIG. 8, pair of torches 102 may be positioned in an other than directly opposite arrangement about sealed component 104 and, rotatable support 126 may be coupled to surface 202 and may be configured to receive sealed component 104 substantially prior to sealed component 104 being welded by pair of torches 102. In the example embodiment, as shown in FIG. 8, lead torch 120 and trail torch 122 (not shown) may be substantially coupled to adjustable rods 118, as described with reference to FIGS. 1-3, and adjustable rods 118 may be coupled to surface 202. Adjustable rods 118 may position lead torch 120 and trail torch 122, such that lead torch 120 and trail torch 122 may be located substantially adjacent and coplanar to weld seam 112 of sealed component 104. In the example embodiment, rotatable support 126 is configured to substantially receive and substantially rotate sealed component 104, as described with reference to FIGS. 1-6, in a direction of rotation as indicated by arrows. Sealed component 104 may be substantially positioned and substantially welded in a similar fashion and method to that shown and described with reference to FIGS. 1-6. Redundant explanation of the welding fashion has been omitted for clarity.

Figure 9:
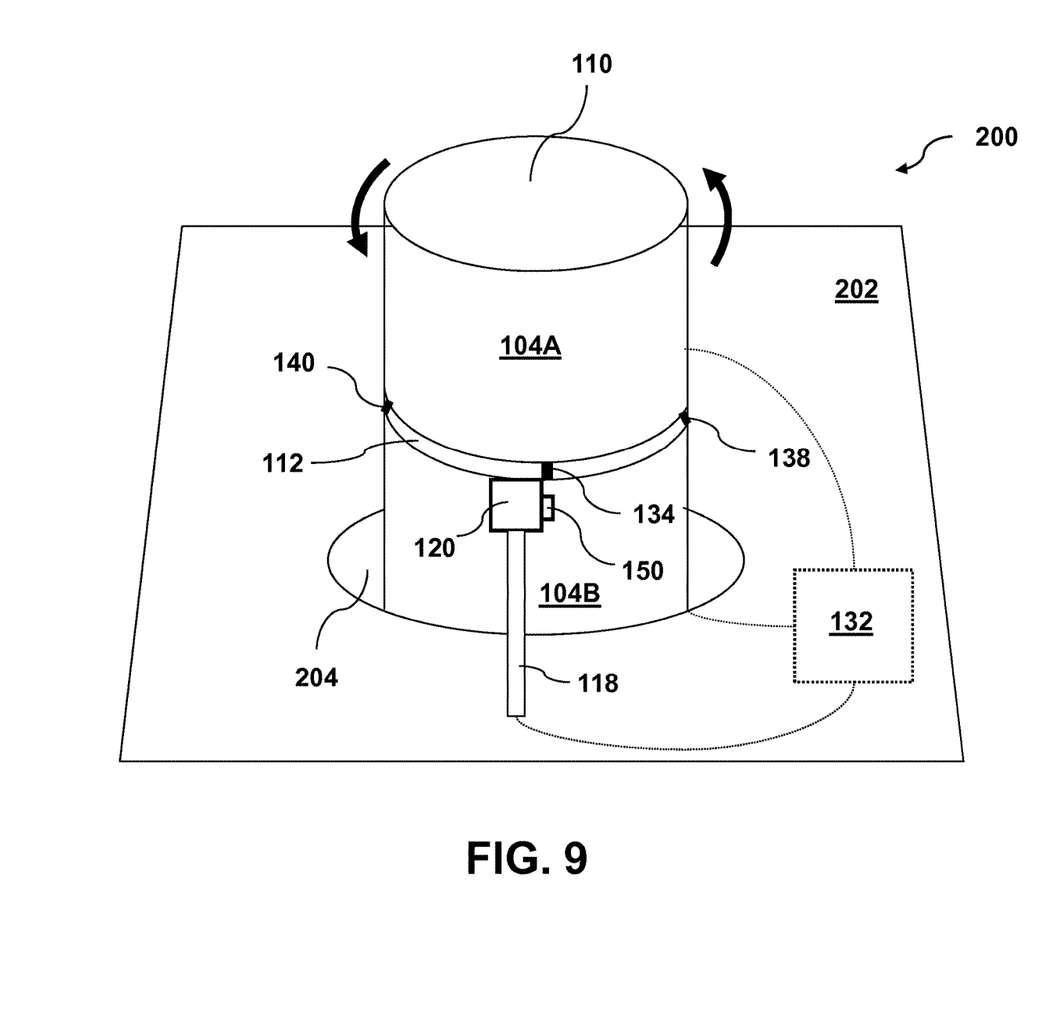
FIG. 9 shows a three-dimensional perspective view of an alternative embodiment of a welding station, including welding system, according to embodiments of the invention.

In an alternative embodiment, as best shown in FIG. 9, welding station 200 may include a recess 204 in surface 202. As shown in FIG. 9, rotatable platform 126, located substantially within recess 204, substantially receives and substantially rotates sealed component 104 within recess 204 in a direction of rotation, as indicated by arrows. As shown in FIG. 9, recess 204 may be provided for substantially receiving substantially large or substantially lengthy sealed component 104, such that sealed component 104 may be substantially encompassed within recess 204. Sealed component 104 may be substantially positioned and substantially welded in a similar fashion to that shown and described with reference to FIGS. 1-6. Redundant explanation of the welding fashion has been omitted for clarity.

In a further alternative embodiment, recess 204 may be substantially adjustable in depth. In the further alternative embodiment, recess 204 may be adjusted such that sealed component 104 may be received by rotatable support 126 and weld seam 112 of sealed component 104 may be substantially positioned adjacent lead torch 120 and trail torch 122 by adjusting the depth of recess 204.

Referring to FIGS. 8 and 9, welding station 200 may also include control system 132, as similarly described and shown in reference to FIGS. 4-6. In the example embodiments, as shown in FIGS. 8 and 9, control system 132 may be coupled to rotatable support 126, lead torch 120 and trail torch 122. As similarly described and shown in reference to FIGS. 4-6, control system 132 may be configured to control the ignition of lead torch 120 and trail torch 122. Redundant explanation of the welding fashion has been omitted for clarity. In an alternative embodiment, control system 132 may also be coupled to rotatable support 126 and may be configured to control the rotation of sealed component 104. In a further alternative embodiment, control system 132 may be configured to control the depth of recess 204 by a pneumatic lift, a hydraulic jack or any other now known or later developed apparatus for elevating substantially large or substantially lengthy sealed component 104.

Welding system 100 of the example embodiments, as shown in FIGS. 8 and 9, may also include camera system 150 (FIGS. 4-6). As similarly discussed and shown in reference to FIGS. 4-6, camera system 150 may be coupled to lead torch 120 and/or trail torch 122 and may provide the user with a visual inspection of the weld of sealed component 104 by lead torch 120 and/or trail torch 122, respectively. Camera system 150 may be integrated with control system 132 or may stand as a separate system as similarly discussed and shown with reference to the other figures herein. Redundant explanation of these elements has been omitted for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A welding system, comprising:
a pair of torches positioned in an other than opposing arrangement to weld a substantially circular sealed component therebetween, wherein the pair of torches both operate simultaneously during at least a part of the time while welding the substantially circular sealed component, and wherein the substantially circular sealed component includes a purge hole linking an inert shielding gas within a cavity positioned within the substantially circular sealed component with an outer surface of the substantially circular sealed component;
a rotatable support configured to rotate the substantially circular sealed component and the pair of torches relative to one another, allowing welding of the purge hole by one of the pair of torches; and
a control system coupled to the pair of torches and the rotatable support, wherein the control system is configured to extinguish a first torch of the pair of torches in response to determining that at least one of the pair of torches reaches a predetermined position relative to the substantially circular sealed component, wherein a second torch of the pair of torches operates continuously before and after the first torch is extinguished, and wherein the predetermined position is selected such that the second torch welds a single unwelded purge hole after the extinguishing of the first torch.

2. The welding system of claim 1, wherein the first torch and the second torch includes a lead torch and a trail torch, the trail torch follows the lead torch by less than 180 degrees relative to a circumference of the substantially circular sealed component.

3. The welding system of claim 2, wherein the trail torch follows the lead torch substantially between 95 degrees and 175 degrees relative to the circumference of the substantially circular component.

4. The welding system of claim 1, further comprising a camera system coupled to at least one of the pair of torches at a base of each of the pair of torches, wherein the camera system provides a visual depiction of a weld for the at least one of the pair of torches while welding the substantially circular sealed component, wherein the visual depiction includes at least one of a thermal image, an infrared image, and a live-motion feed.

5. The welding system of claim 4, wherein the camera system provides a signal to the control system and wherein the control system determines when at least one of the pair of torches reaches a predetermined position relative to the substantially circular sealed component in response to the signal.

6. The welding system of claim 1, wherein the pair of torches are coplanar with one another.

7. The welding system of claim 1, wherein the control system controls an ignition and an extinguishing of each of the pair of torches during welding of the substantially circular sealed component, and wherein a difference between the extinguishing of each of the pair of torches maintains a predetermined pressure differential between the cavity and the outer surface of the substantially circular sealed component.

8. The welding system of claim 1, wherein the substantially circular sealed component further includes a plurality of purge holes, and the pair of torches is further configured to weld the plurality of purge holes of the substantially circular sealed component.

9. The welding system of claim 1, wherein the purge hole of the substantially circular sealed component is located on a weld seam substantially coplanar with the pair of torches.

10. The welding system of claim 1, further comprising a plurality of pairs of torches, wherein each torch of the welding system comprises one of a pair of torches in an other than opposing arrangement.

11. The welding system of claim 1, further comprising a pair of adjustable stands, each of the pair of adjustable stands being coupled to one of the pair of torches and being configured to vary the height and a separation distance from the outer surface of the substantially circular component for a respective one of the pair of torches.

12. The welding system of claim 1, further comprising a pair of adjustable rods, each of the pair of adjustable rods being coupled to one of the pair of torches and including means thereon for rotating one of the pair of torches around a track system, wherein the pair of adjustable rods is configured to position the lead torch and the trail torch relative to each other.

13. The welding system of claim 1, further including a timer in the control system, wherein the timer provides a measurement whereby the control system determines when at least one of the pair of torches reaches a predetermined position relative to the substantially circular sealed component.

14. The welding system of claim 1, further including a positional sensor in the control system, wherein the positional sensor provides a measurement whereby the control system determines when at least one of the pair of torches reaches a predetermined position relative to the substantially circular sealed component.

15. A welding system, comprising:
a pair of torches positioned in an other than opposing arrangement to weld a substantially circular sealed component therebetween, wherein the pair of torches both operate simultaneously during at least a part of the time while welding the substantially circular sealed component, and wherein the substantially circular sealed component includes a purge hole linking an inert shielding gas within a cavity positioned within the substantially circular sealed component with an outer surface of the substantially circular sealed component;
a rotatable support configured to rotate the substantially circular sealed component and the pair of torches relative to one another, allowing welding of the purge hole by one of the pair of torches; and
a control system coupled to the pair of torches and the rotatable support, wherein the control system is configured to extinguish a first torch of the pair of torches during welding of the substantially circular sealed component in response to determining that at least one of the pair of torches reaches a predetermined position relative to the substantially circular sealed component, wherein the predetermined position is selected to substantially equalize pressure between the cavity and an outer surface of the substantially circular sealed component through the purge hole during welding of the substantially circular sealed component, and wherein a second torch of the pair of torches operates continuously before and after the first torch is extinguished, and wherein the second torch welds a single unwelded purge hole after the extinguishing of the first torch.

16. The welding system of claim 15, wherein the first torch and the second torch includes a lead torch and a trail torch, the trail torch follows the lead torch by less than 180 degrees relative to a circumference of the substantially circular sealed component.

17. The welding system of claim 16, wherein the lead torch is the first torch and the trail torch is the second torch, and wherein the control system simultaneously ignites the lead torch and the trail torch, allows the lead torch to weld a first length of the substantially circular sealed component, and extinguishes the lead torch prior to the trail torch welding a second length of the substantially circular sealed component, wherein the second length of the substantially circular sealed component is greater than the first length of the substantially circular sealed component.

18. The welding system of claim 17, wherein the control system extinguishes the lead torch in response to the lead torch welding a trail torch ignition point located on the substantially circular sealed component, and the control system extinguishes the trail torch in response to the trail torch welding a lead torch ignition point located on the substantially circular sealed component.

19. The welding system of claim 15, wherein the pair of torches are coplanar with one another.

20. The welding system of claim 15, further comprising a camera system coupled to at least one of the pair of torches, wherein the camera system provides a visual depiction of a weld for the at least one of the pair of torches while welding the substantially circular sealed component, wherein the visual depiction includes at least one of a thermal image and an infrared image.

* * * * *